Jan. 18, 1966  G. MAES  3,229,311
RADIOSONOBUOYS
Filed Dec. 17, 1963  3 Sheets-Sheet 1

Inventor: Guy Maes
By Kemon, Palmer, Stewart & Estabrook
Attorneys

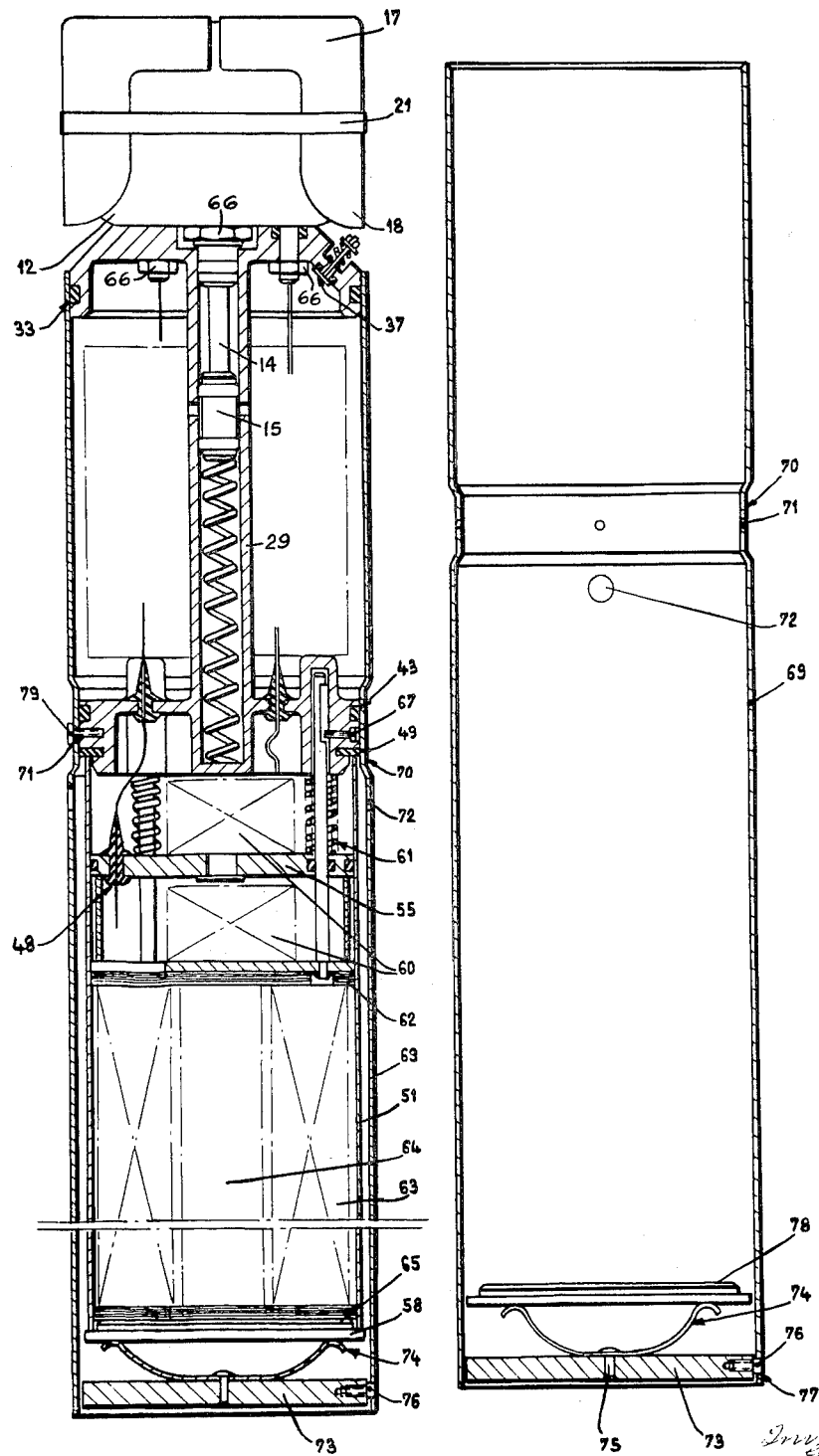

Jan. 18, 1966 G. MAES 3,229,311
RADIOSONOBUOYS
Filed Dec. 17, 1963 3 Sheets-Sheet 3

Inventor: Guy Maes
By Kenyon, Palmer, Stewart
& Estabrook
Attorneys

_United States Patent Office_ 3,229,311
Patented Jan. 18, 1966

3,229,311
RADIOSONOBUOYS
Guy Maes, Neuilly-sur-Seine, France, assignor to
L'Electronique Appliquee, Paris, France
Filed Dec. 17, 1963, Ser. No. 331,160
Claims priority, application France, Dec. 21, 1962,
919,484
4 Claims. (Cl. 9—8)

The present invention concerns improvements in or relating to radiosonobuoys adapted to be dropped into the sea from aircraft and ships and has as an object thereof the provision of a radiosonobuoy which is compact for storage and handling which deploys certain elements thereof in a reliable and simple manner both during the fall thereof and upon impact with the surface of the water.

A further object of the invention is to provide a radiosonobuoy assembly as described which is mechanically arranged such that easy access to the electrical components contained therein for any required adjustments and tests is provided prior to closing, and which also permits simple mounting of the parts thereof as well as full security of operation of the device in a floating condition.

According to the invention, there is provided a radiosonobuoy comprising, in a single unitary housing, three sub-assemblies. The first sub-assembly comprises a gas-inflatable float and an aerial which is erected when said float is inflated. The second sub-assembly comprises the electrical equipment and the gas reservoir for inflating the float. The third sub-assembly comprises a plurality of compartments for salt water activated batteries and a hydrophone assembly. The three sub-assemblies are so arranged that, when the buoy is dropped, the float is inflated and the aerial is erected during the fall thereof toward the water. When the buoy has impacted the water, at least one of the battery compartments fills with salt water while the hydrophonic cable deploys for immersion of the hydrophone beneath the water.

For explaining the invention, reference is made to the accompanying drawings wherein:

FIG. 4 shows a longitudinal cross-section view of the casing for cooperation of the sub-assemblies;

FIG. 5 is a view of radiosonobuoy after complete assembly in handling condition, part of said view being shown in cross-section; and, FIGURES 6, 7 and 8 show the condition of the buoy at the beginning of its fall, the end of its fall and, after impact, afloat in the sea, respectively.

Figure 1:
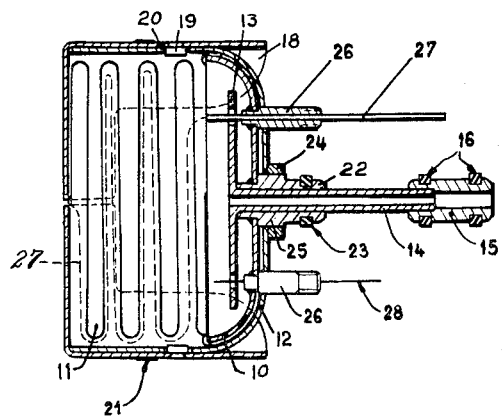
FIG. 1 shows a longitudinal cross-section view of the first sub-assembly.

The float-aerial-sub-assembly or unit, FIGURE 1, comprises a cup-shaped member 10 carrying a flexible, inflatable float 11 folded within a casing 12. The upper part of the float is provided with an extension, (FIGURES 6 through 8) containing an emitter aerial 27 made of flexible electric wire attached at either end of the extension. When the extension is erected (FIGURES 7 and 8) from the action of the compressed gas which inflates the float during free fall of the buoy, the wire making up the aerial 27 is stretched between either end of the extension. The electrical connection between the aerial and the radio equipment, achieved by an electrical conductor (not shown) within said first unit connected to the aerial cable 27 which passes out of said unit through a watertight terminal connection 26.

A disc-shaped member 13 having a hollow rod 14 extending therefrom is mounted in the casing 12, the rod in turn having a slide valve 15 screwed on the end thereof. A pair of circular seals 16 are provided on the slide valve 15. A folded float lies on the disc-shaped member 13 and is secured by two cylindrical, half bottom parts 17 which are provided with tabs 18 and are disposed coaxial to the casing 12. Lugs 19 are disposed on the interior surface of the part 17 and engage holes 20 through the casing 12. An elastic bangle 21 is placed over the tabs 18 to hold them against the casing 12.

A tube 22 is centrally mounted on the cup-shaped member 10, the tube in turn slidably accommodating the rod 14. A circular seal 23 is mounted in a groove around the tube 22 to insure sealing with respect to the atmosphere between the first unit including the float and the second unit including the electrical equipment. A nut 24, screwed on the insulated portion of the tube 22, fixes the cup-shaped member 10 to the float within the casing 12. Two hollow screws 26, mounted through the cup 10 and passing through the casing 12, hold the first two units assembled and also provide watertight passages for an aerial cable 27 and a supply wire 28. The supply wire 28 is connected to a light (not shown) which is mounted at the top of the buoy. The screws 26, as well as the tube 22 may be connected to the cup-shaped member 10 by soldering.

Figure 2:
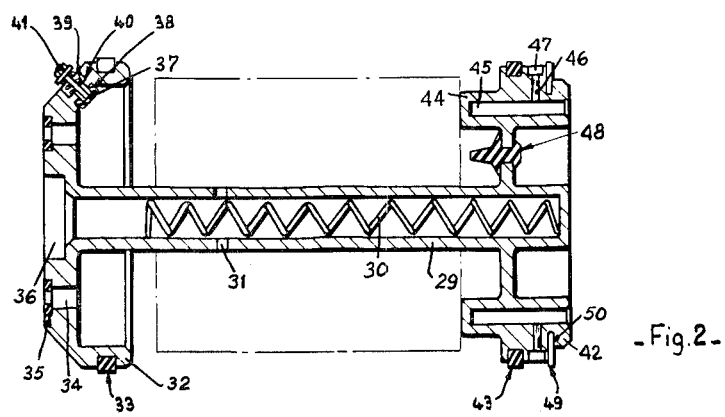
FIG. 2 shows a longitudinal cross-section view of the second sub-assembly.
Figure 3:
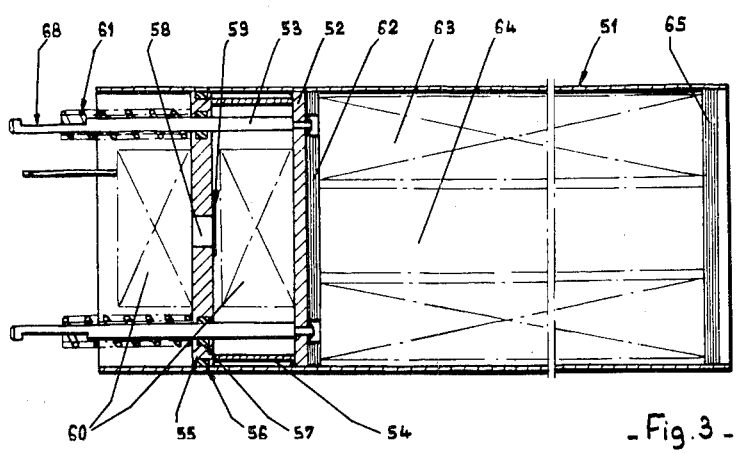
FIG. 3 shows a longitudinal cross-section view of the third sub-assembly.

The electronic equipment unit of FIGURE 2 constitutes a chassis shown in a single piece for clarity of representation. The central post of the frame, which is hollow and open at its upper end (at the left of FIGURE 2) has a spring 30 disposed therein and is perforated with small openings such as at 31. A head 32, mounted on the open end of the post, carries a circular seal 33. Two openings 34, provided with sealing rings 35 are disposed through the head 32 to enable the screws 26 of the first unit to pass through the second unit when the units are assembled. At assembly, an enlarged bore 36 also accommodates the nut 24 of the first unit. A valve 37 is mounted through the head 32, and engages a circular seal 38, the valve being maintained in this position by a spring 39 which is disposed between the bottom of a socket 40 and a nut 41 screwed on the valve rod.

The lower wall (on the right hand side of the drawing) of the frame 42, carries a circular seal 43. Seals 33 and 43 will serve in the final assembly operation to provide watertight engagement between the units and the external housing when disposed therein.

A pair of bosses 44 comprising housings 45 are provided for receiving rods from the third unit to enable the units to be secured together. In securing the units, two threaded holes 46 are disposed through the wall 42 to receive screws therein, the heads of which are accommodated within the sockets 47. Watertight passages such as shown in 48 are provided to accommodate the cables and wire leads which are necessary to connect the supply unit to the electronic equipment unit. A flat circular seal 49 engages a deep groove 50 in the wall 42 and insures, after final assembly, a sealing engagement with the supply unit.

The electronic equipment is indicated by a dotted rectangle surrounding the central post 29, the detail of the equipment not being important since it is outside of the scope of the invention. At least part of the elements of the equipment may be carried by the central post 29.

The third sub-assembly or unit is provided for the supply batteries and the hydrophone and comprises a cylindrical tube 51 closed by a watertight partition 52 which may be soldered to the tube. Two rods 53 are provided to fix the third unit to the second unit. Salt water activated batteries 60 are fixed by any suitable means to the partition. A tubular structure 54 connects the partition 52 to a second partition 55 which has mounted thereon a seal 56 and sealing rings 57, the rings accommodating the rods 53. Watertight passages (not shown) are also provided through the second partition 55 to provide for passage of the electrical wiring. Additional salt water activated batteries are fixed to the partition 55. Holes 58 are disposed through the partition 55 and are closed with salt water destructible plugs 59. Springs 61 are arranged on the rods 53 and bear on the partition 55 to insure the opening of the upper compartment of the batteries when the buoy is activated. A shock absorbing disc is placed on the face of the partition 52 and is disposed toward the coil of the hydrophone cable 63, the cable being disposed in a tubular arrangement to house the hydrophone 64. A second shock absorbing disc 65 is placed within the tube 51 against the lower face of the hydrophone and hydrophone cable arrangement. The arrangement is, per se, outside of the scope of the invention.

The housing of the buoy is made of a cylinder 69 for enclosing the second and third units as is shown in FIGURE 4. The cylinder 69 is made with a locally restricted portion 70, holes 71 being provided therethrough to accommodate set screws. Holes 72 are provided to vent air and gas from the batteries. An ejectible bottom 73, which carries a spring 74 mounted by a rivet 75, for example, is connected to the bottom of the tube by screws such as those shown at 76, disposed through holes 77 provided in the tube 69. A plate 78 is disposed over the spring 74.

The three above-described units are separately made and since each is a complete sub-assembly, tests on the units may be independently made prior to assembly.

Assembly of the unit is accomplished as follows: The leads and cables 27 and 28 from the first unit are passed through the passages 35 and 34 of the second unit. The slide valve 15, having the seals 16 thereon, is introduced into the cylinder 29 thereby compressing the spring 30. The central member 22 and the screws 26 are engaged in the cylinder of the post 29 and the socket 34 of the head 32 respectively. Nuts 66 (FIGURE 5) assure the sealing of the rings 35 and the fixing of the two units to one another. The assembly of the third unit is then made by passing the electrical leads from the batteries through the passages 48, thereafter introducing the rods 53 into the sockets 45 of the partition by compression of the springs 61. Two screws 67 are screwed into the holes 46 and engage grooves 68 in the rods 53 while maintaining the units in abutting relation. The complete assembly thus made only requires the handling of two nuts and two screws. The electrical connection between the two cables and the electrical wires may then be effected and the necessary tests and adjustments of the complete buoy may also made since, obviously any part of the buoy is exposed for such operations.

Finally the casing 69 is slipped over the second and third units. The spring 61 of the first compartment of the batteries are compressed by action of the spring 74 acting on the plate 78, which is of the higher strength than the springs 61. The upper portion of the tube 51 then engages the flat circular joint 49 thus closing the battery compartment. The cable coil 63 and the hydrophone 64 are pressed between the shock absorbing discs 62 and 65. The circular seals 33 and 43 of the frame engage the tube 69 at the restricted diameter portion 70 thereof. Four screws 79, passing through the holes 71 of the casing, are threaded into the holes provided in the partition 42 of the frame. The final step of assembly necessitates only four screws. The second unit containing the electrical equipment then constitutes a totally air-tight chamber or volume to be used to store compressed air which is introduced therein through the valve 37. This chamber of compressed gas will be automatically used for providing inflation of the float when the buoy is dropped.

Figures 6, 7:
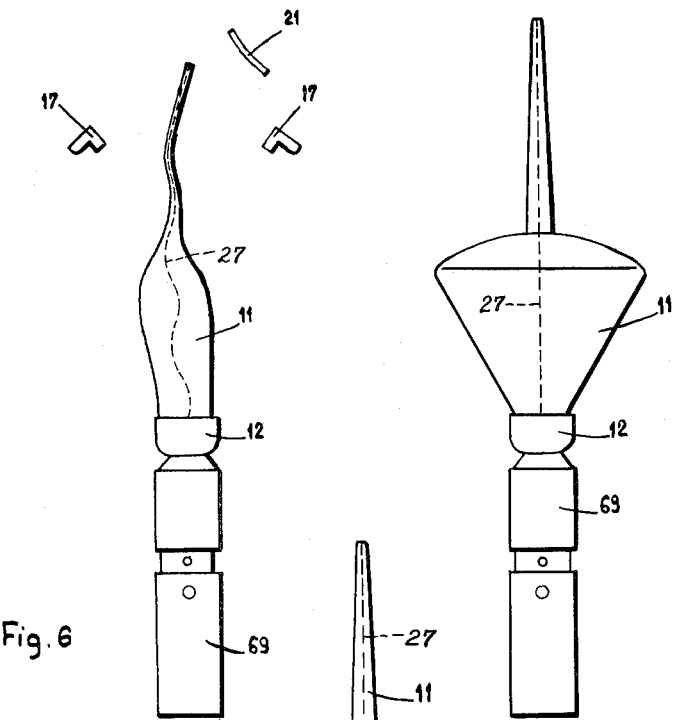

The operation of the buoy from the time it is dropped overboard may be described as follows with particular reference to FIGURE 5: At the beginning of the fall, the air pressure on the tabs 18 of the halves 17 of the bottom deploys the tabs from the casing 12 against the action of the elastic bangle 21 which will slip or break due to the spreading of the tabs. The lugs 19 disengage the holes 20 (FIGURE 1) and the members 17 are freed and fly away (FIGURE 6). The folded float 11 is pushed by the disc-shaped member 13 (FIGURE 1) through the action of the spring 30 and, as soon as it is liberated from the casing 12, it is sucked out by the airflow. The movement of the dics 13, and consequently of the slide valve 15 through the action of the spring 30, also unmasks the perforations 31 (FIGURE 2) of tube 29. The compressed air from the second unit escapes through the perforations and the valve 15, through the hollow rod 14 and into the float 11 which is consequently inflated and deployed. Note that gas other than air may be used to perform inflation. The inflated float together with its erected extension containing the aerial 27 then constitutes an aerodynamic brake which slows down the fall of the buoy and also an aerodynamic stabilizer which insures proper disposition at impact of the buoy for suitable penetration into water (FIGURE 7).

Figure 8:
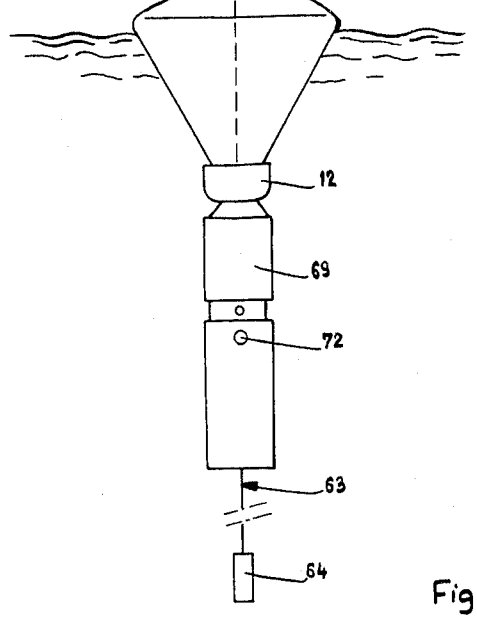

When the buoy impacts the surface of the water, the screws 76 which maintain the bottom plate 73 are sheared by the shock of impact while the spring 74 on the other hand absorbs shock on the equipment. The bottom plate is pushed down by the spring 74 and sinks with the member 78. The springs 61 will open the battery compartment by pushing the partition 55, tubular strut 54, and partition 52 downwardly. Since partition 52 is fixed to the tube 51, the tube slides downwardly under the influence of the springs 61, breaking the seal between the seal 49 and the upper end of the tube 51. The hydrophone also sinks since it is free from the plate 65 and, as it sinks, the coil of the hydrophone cable unwinds. When the buoy comes to the surface, it floats as shown in FIGURE 8 and is in full radio electric and sonic operating condition.

As set forth above, the upper compartment of the batteries has been opened by the impact with the water. The lower compartment remains closed and water tight until the salt water has dissolved the material of the plugs 59. If needed, more than two battery compartments may be arranged for sequential activation whereby a longer duration of the activity of the buoy may be obtained.

I claim:

1. A radiosonobuoy comprising the combination of a first unit comprising a gas inflatable float having an extension erectable for housing a radioelectric aerial when said float is inflated, a second unit containing the electrical equipment of the buoy, and said second unit further comprising an airtight chamber storing compressed gas for the inflation of said float, a third unit comprising a plurality of closed salt water battery compartments and a hydrophone and hydrophone cable arrangement, an external casing housing the two latter units, means actuated by the passage of the buoy through the atmosphere for initiating the inflation of the float by the compressed gas from the second unit during the fall of the buoy, and means for opening one of the battery compartments and deploying said hydrophone on impact of the buoy with the water and the opening with delay of the remaining battery compartments when the buoy is afloat;

whereby inflation of said float is initiated during the fall of the buoy to stabilize and break the fall of the buoy and said hydrophone is deployed and one of the batteries is energized to energize said electrical equipment and transmit signals from said hydrophone through said aerial.

2. Radiosonobuoy according to claim 1, wherein said float is folded in the first unit within a casing having a spring arrangement and release means therefor, said release means being actuated by the passage of the buoy through the atmosphere to enable said spring arrangement to eject said float from said casing, and a slide valve actuated by said spring arrangement to admit compressed gas from the said second unit into said float for inflation thereof.

3. Radiosonobuoy according to claim 2, wherein said spring arrangement comprises a disk urged by a spring, and said release means comprises a tabbed wall on said casing retaining said float against urging by said spring, a first hollow tube secured to said disk, said slide-valve being carried on the end of said first hollow tube, and a second hollow tube in said second unit enclosing said slide-valve, said second hollow tube having a transverse opening therein disposed to be closed by said slide-valve.

4. Radiosonobuoy according to claim 1, wherein said third unit is made air and watertight by an external casing, a valve in said second unit for introduction of compressed gas therein, and the watertightness of said third unit is completed by a spring pressed end plate supporting the hydrophone cable and hydrophone arrangement, the impact on the water acting against said spring action to displace said plate to release said hydrophone and open said third unit to sea water.

References Cited by the Examiner

UNITED STATES PATENTS

| | | | |
|---|---|---|---|
| 3,093,808 | 6/1963 | Tatnall et al. | 9—8 X |
| 3,123,842 | 3/1964 | Oeland et al. | 9—9 |
| 3,132,322 | 5/1964 | Maes | 9—8 X |

FOREIGN PATENTS 1,228,001  3/1960  France.

MILTON BUCHLER, *Primary Examiner.*

FERGUS S. MIDDLETON, *Examiner.*